(12) United States Patent
Nicholson

(10) Patent No.: US 7,726,110 B2
(45) Date of Patent: Jun. 1, 2010

(54) DISCHARGE CHUTE FOR TURF MOWER

(75) Inventor: Gary L. Nicholson, Beatrice, NE (US)

(73) Assignee: Exmark Manufacturing Company, Inc., Beatrice, NE (US)

( * ) Notice: Subject to any disclaimer, the term of this patent is extended or adjusted under 35 U.S.C. 154(b) by 88 days.

(21) Appl. No.: 11/509,918

(22) Filed: Aug. 24, 2006

(65) Prior Publication Data

US 2008/0047247 A1 Feb. 28, 2008

(51) Int. Cl.
*A01D 67/00* (2006.01)

(52) U.S. Cl. .................................... 56/320.2

(58) Field of Classification Search ........ 56/3, 56/13.3, 16.6, 194, 202, 320.1, 320.2
See application file for complete search history.

(56) References Cited

U.S. PATENT DOCUMENTS

| | | | | |
|---|---|---|---|---|
| 2,756,556 | A * | 7/1956 | Watkins ........................ | 56/189 |
| 3,049,853 | A | 8/1962 | Horner et al. | |
| 3,132,457 | A * | 5/1964 | Slemmons .................... | 56/202 |
| 3,400,523 | A | 9/1968 | Klingofstrom et al. | |
| 3,503,194 | A | 3/1970 | Ritums | |
| 3,568,421 | A * | 3/1971 | Smith et al. .................... | 56/255 |
| 3,646,739 | A | 3/1972 | Dahl | |
| 3,648,445 | A | 3/1972 | Efflandt | |
| 3,673,778 | A * | 7/1972 | Ramey ........................ | 56/320.2 |
| 3,726,069 | A * | 4/1973 | Cope ........................... | 56/202 |
| 3,760,572 | A | 9/1973 | Marion et al. | |
| 3,797,214 | A * | 3/1974 | Erdman et al. ............. | 56/320.2 |
| 3,805,499 | A | 4/1974 | Woelffer | |
| 4,008,559 | A * | 2/1977 | Lessig et al. ................ | 56/320.2 |
| 4,047,367 | A * | 9/1977 | Thorud ........................ | 56/202 |
| 4,142,351 | A | 3/1979 | Neice et al. | |
| 4,158,279 | A * | 6/1979 | Jackson ........................ | 56/202 |
| 4,258,539 | A | 3/1981 | Pearce et al. | |
| 4,322,938 | A | 4/1982 | Efflandt | |
| 4,502,271 | A | 3/1985 | Hansen et al. | |
| 4,672,799 | A | 6/1987 | Parish | |
| 4,897,988 | A * | 2/1990 | Schweitz et al. ............. | 56/202 |
| 5,101,617 | A | 4/1992 | Hare et al. | |
| 5,195,311 | A | 3/1993 | Holland | |
| 5,331,794 | A | 7/1994 | Reichie | |
| 5,410,867 | A * | 5/1995 | Plamper et al. ............. | 56/320.2 |

(Continued)

OTHER PUBLICATIONS

"Springs." imperialspring.com. 2001. Imperial Spring Company, Inc. Products. Nov. 5, 2001. <http://web.archive.org/web/*/http://www.imperialspring.com/products.htm>.*

(Continued)

*Primary Examiner*—Thomas B Will
*Assistant Examiner*—Mai T Nguyen
(74) *Attorney, Agent, or Firm*—Briggs and Morgan, P.A.

(57) ABSTRACT

A discharge chute assembly for a turf mower having a resilient deflector and a frame connecting the deflector to a mower deck proximate to a side discharge outlet. The frame includes one or more extension elements which engage the deflector. In one embodiment the extension elements are captured within pockets defined within the deflector. The pivoting frame mass facilitates a quick recovery to a guarded condition after the deflector rises in contact with an obstruction. Additionally, the frame mass allows the deflector to maintain an upright, unguarded orientation without additional biasing forces which is useful, for example, during a machine loading operation.

13 Claims, 5 Drawing Sheets

U.S. PATENT DOCUMENTS

| | | | | |
|---|---|---|---|---|
| 5,491,964 | A | * | 2/1996 | Butler ........................ 56/320.2 |
| 5,794,425 | A | * | 8/1998 | Thomason et al. ............ 56/202 |
| 5,913,804 | A | * | 6/1999 | Benway ...................... 56/320.2 |
| 5,992,135 | A | | 11/1999 | Benway |
| 6,154,064 | A | | 11/2000 | Proebsting |
| 6,184,722 | B1 | | 2/2001 | Hayakawa |
| 6,874,309 | B1 | * | 4/2005 | Bellis, Jr. ................... 56/320.2 |
| 6,986,240 | B2 | * | 1/2006 | Kallevig ..................... 56/320.2 |
| 2004/0168424 | A1 | * | 9/2004 | Baumann et al. ........... 56/320.1 |

OTHER PUBLICATIONS

Letter from The University of Georgia Research Foundation, Inc. and attachment: "UGARF Case 950 New Design and Material for Mower Discharge Guard/Outlet Chute," dated Jun. 13, 2001.

* cited by examiner

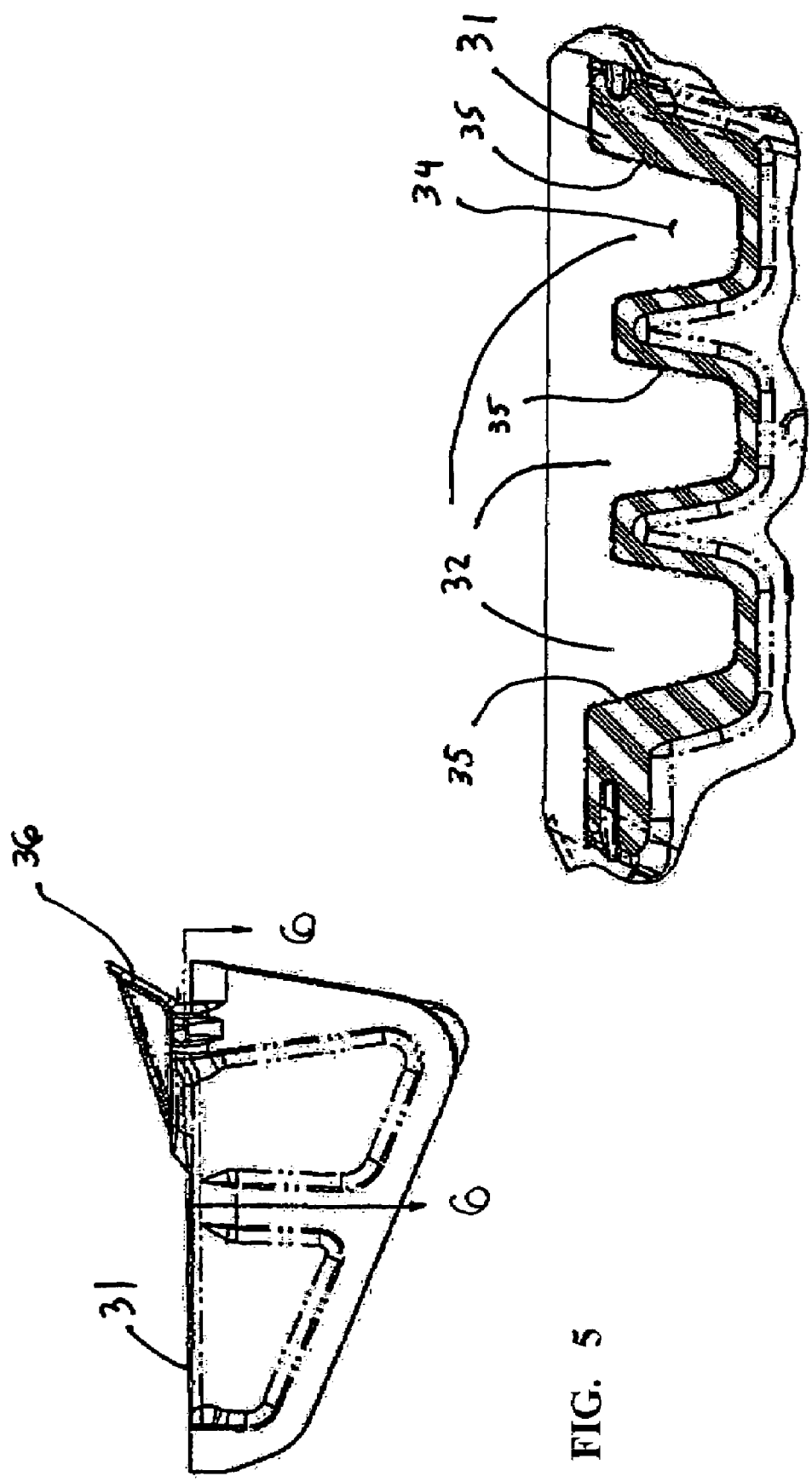

DISCHARGE CHUTE FOR TURF MOWER

TECHNICAL FIELD

The present invention relates to a turf mower and more particularly to a side discharge chute for a turf mower.

BACKGROUND OF THE INVENTION

Turf cutting equipment, such as rotary mowers, have a cutting deck carrying one or more turf cutting implements within a cutting chamber. Open access to the cutting chamber is often provided to allow for wider dispersal of grass clippings. Side discharge mowers may have an access provided at a laterally disposed side of the cutting deck and be equipped with a discharge deflecting chute to keep debris thrown from the mower blade at a very low altitude. Many known discharge deflecting chutes are generally rigid and are often damaged during use from contact with obstacles.

BRIEF SUMMARY OF THE INVENTION

The present invention is directed to a resilient discharge deflecting chute. In a preferred embodiment, a resilient deflector has memory characteristics and returns to an original shape even after substantial deformation from obstacle contact. The resilient deflector is connected at one end to a movable frame which allows the deflector to pivot relative to the mower deck. The frame includes a pair of hinge arms and a plurality of extensions sized to engage interior surfaces of the deflector.

In one embodiment, a deflector chute assembly includes a resilient, molded deflector coupled at one end to a frame. Portions of the frame are inserted into the deflector to provide additional stability and rigidity to the deflector during use. The inserted frame portions can be tongue-like extensions which are sized to be received into correspondingly sized pocket portions defined at an end of the deflector. The frame also defines a mounting surface which engages a mounting platform of the deflector. Fasteners are used at the mounting interface to secure the frame to the deflector. The frame includes a pair of hinge arms which are pinned to a hinge support on the mower deck to provide a movable connection between the deflector and the mower deck.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 5 is a side view of the resilient deflector of FIG. 4.

FIG. 6 is a cross-sectional view of the resilient deflector taken along lines 6-6 of FIG. 5.

DETAILED DESCRIPTION OF THE INVENTION

Figure 1:
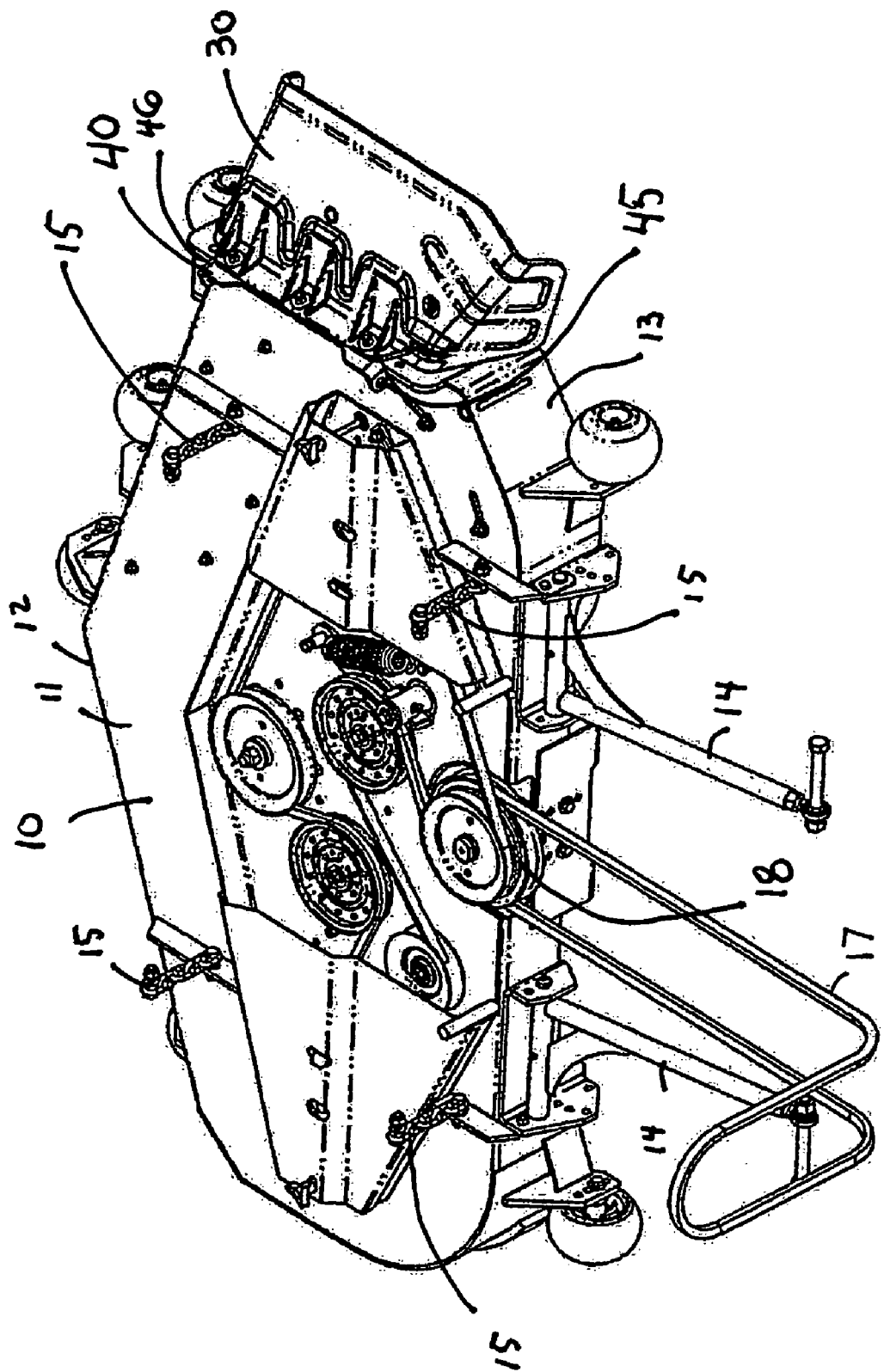
FIG. 1 illustrates a turf mower deck having a deflector chute assembly of the present invention.
Figure 2:
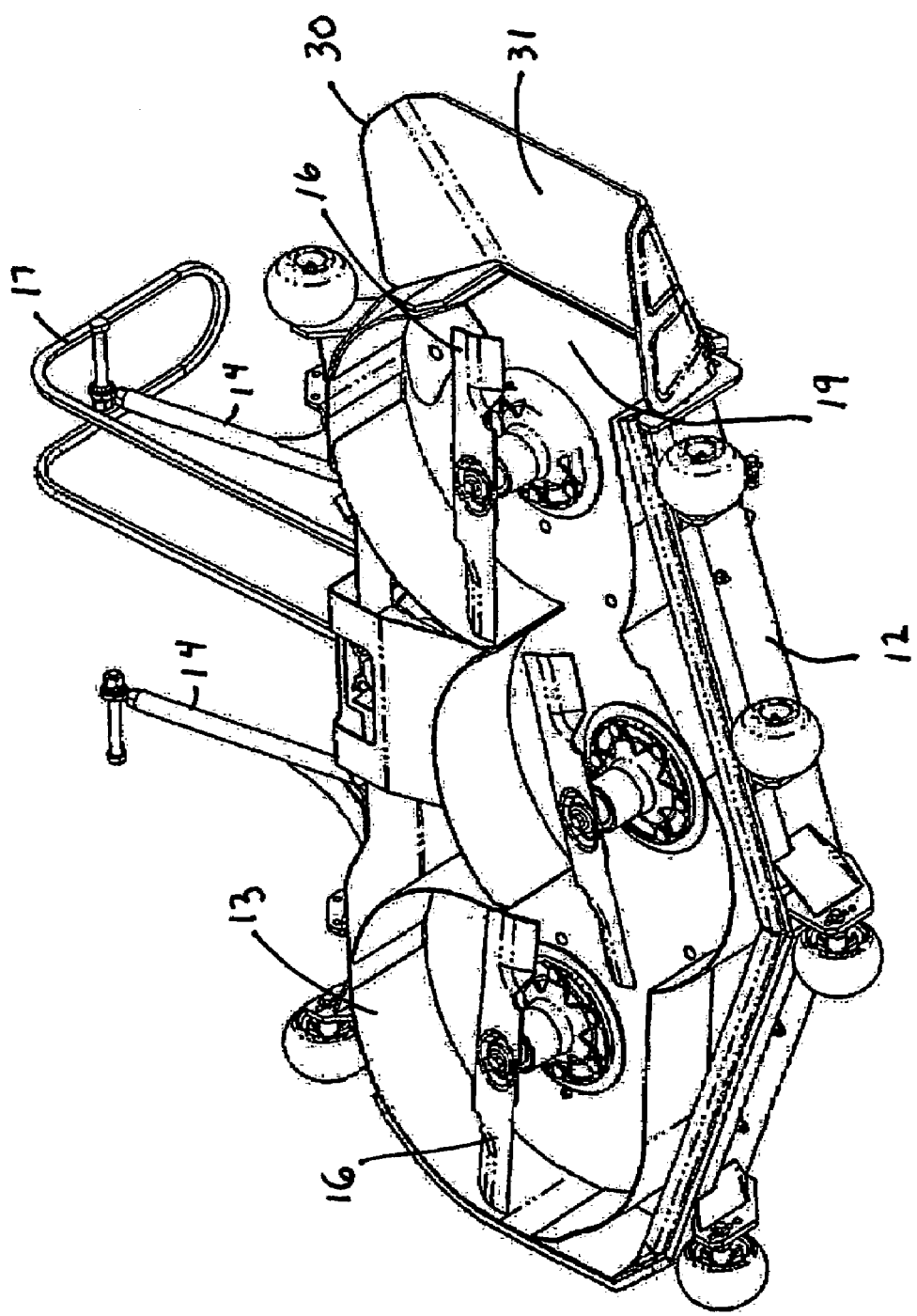
FIG. 2 illustrates a bottom perspective view of the mower deck of FIG. 1.

FIGS. 1 and 2 show mower deck 10 as removed from a turf mowing vehicle (not shown) and including a discharge chute assembly 30. Mower deck 10 includes a top wall 11, front wall 12 and rear wall 13 and is connected to the turf mower by support arms 14 and chains 15. Mower deck 10 defines a downwardly facing cutting chamber carrying cutting blades 16 adapted to rotate in a generally horizontal cutting plane about a generally vertical rotational axis. Each rotary cutting blade 16 has sharpened cutting edges which cut the grass as blade 16 rotates in its cutting plane. A means for rotating the cutting blade within cutting chamber is provided on deck 10. As shown, the rotating means includes a belt 17 and pulley 18 system. Alternatively, individual electric or hydraulic motors (not shown) may be utilized to power the cutting blades. A side wall opening 19 defines a grass discharge opening to allow grass clippings to exit deck 10. Discharge chute assembly 30 is connected at the grass discharge opening of mower deck 10.

Figure 3:
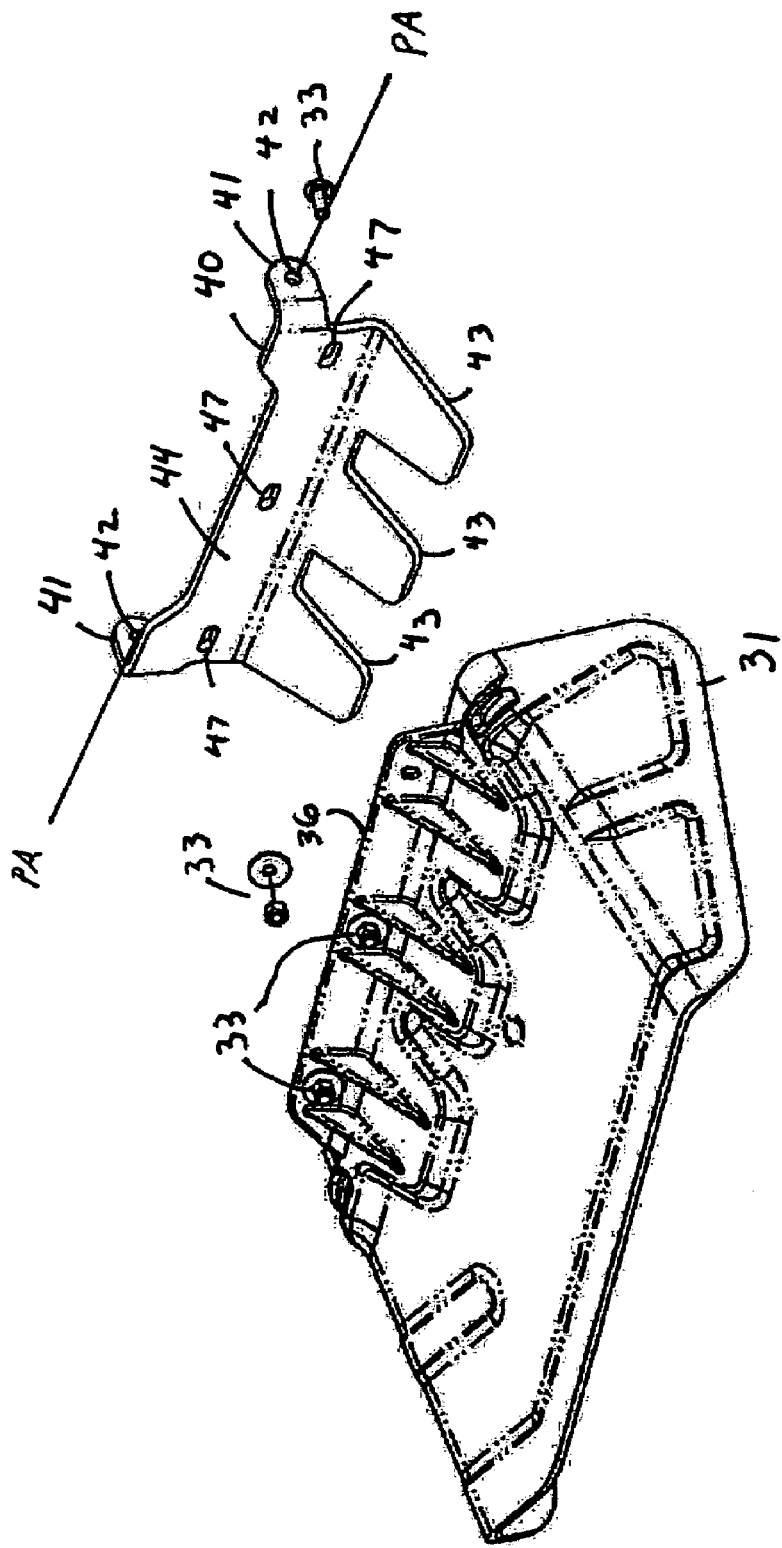
FIG. 3 is an exploded perspective view of a portion of the deflector chute assembly of FIG. 1.

FIG. 3 is an exploded perspective view of a portion of discharge chute assembly 30 as removed from deck 10. Discharge chute assembly 30 includes a resilient deflector 31 and frame 40 for connecting deflector 31 to cutting deck 10. As described in more detail hereinafter, extending portions 43 of frame 40 engage pocket portions 32 of deflector 31. Deflector 31 and frame 40 are secured together with fasteners 33, for example a threaded fastener, washer and nut. Portions of fasteners 33 are passed through apertures in deflector 31 and frame 40.

Discharge chute assembly 30 is movably connected to mower deck 10 via a hinge connection which permits the discharge chute assembly 30 to assume a guarded position (as shown in FIG. 1) and an unguarded position (not shown) where the discharge chute assembly 30 has pivoted away from the ground surface about a pivot axis, shown as line PA in FIG. 3. When in the guarded position, discharge chute assembly 30 is generally aligned with side discharge opening 19 so that clippings are directed through an interior region of discharge chute assembly 30. Deflector 31 is supported by frame 40 on one end and is unsupported at a free end. Deflector 31 may be manufactured from a wide variety of natural and/or synthetic elastomeric products, including but not limited to polymer-based and metal materials.

Figure 4:
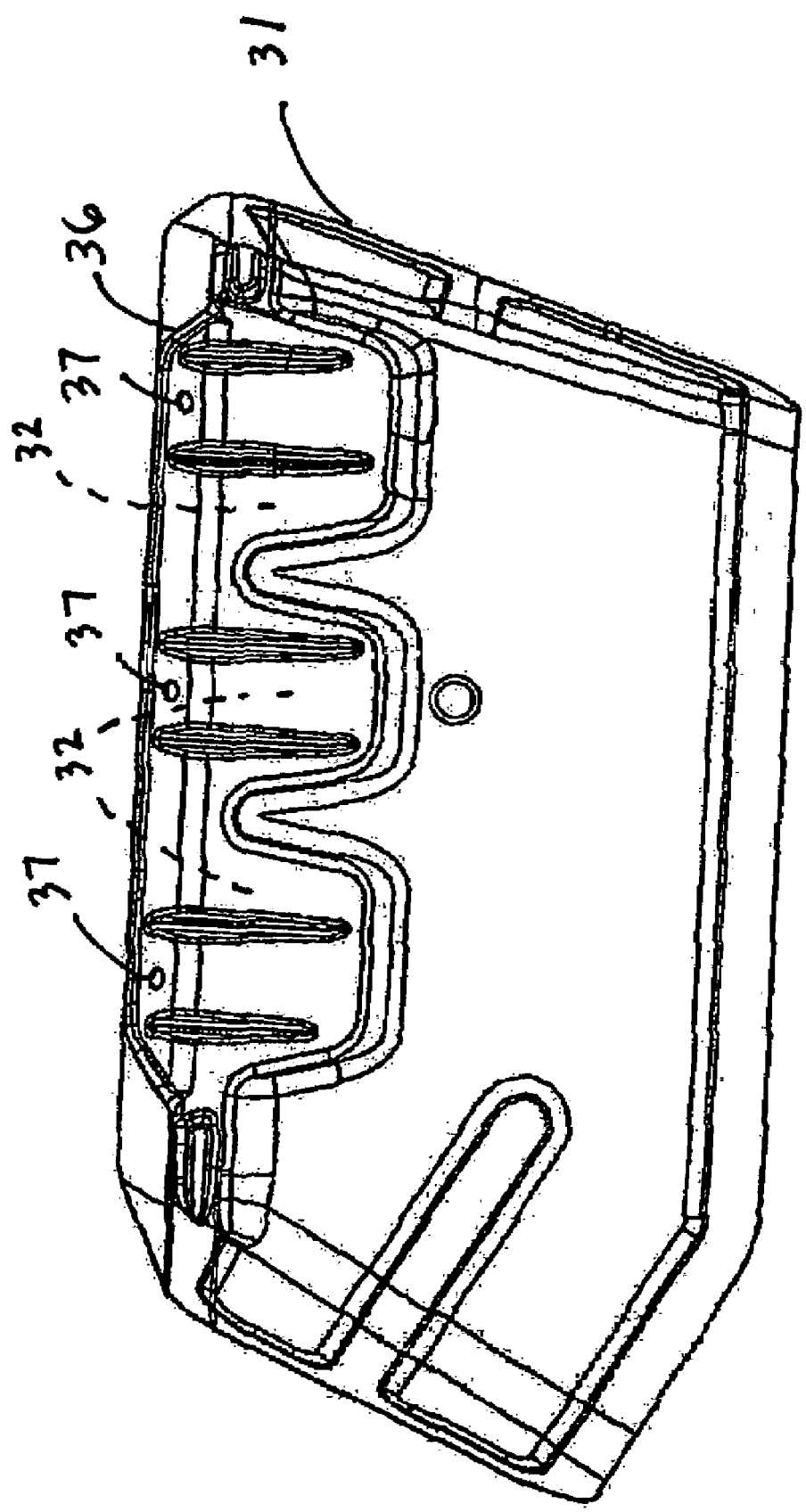
FIG. 4 is a top view of the resilient deflector of the deflector chute assembly of FIG. 1.

FIGS. 4 and 5 shows top and side elevational views, respectively, of deflector 31. FIG. 6 is a cross-sectional view of deflector 31 taken along lines 6-6 of FIG. 5. FIG. 6 shows the interior of pockets 32, which in this embodiment, are sized in relation to extensions 43 of frame 40. In this embodiment, pockets 32 include a pair of generally planar opposite walls 34 (only one shown in FIG. 6) and side walls 35 adapted to capture side edges of frame extensions 43. In this embodiment, extensions 43 of frame 40 are adapted to be inserted into closed pockets 32. In other embodiments, extensions 43 may engage open-ended pockets or other open structures, such as loops, defined within deflector 31. Deflector 31 further includes a generally planar mount surface 36 having a plurality of apertures 37.

Frame 40 includes a pair of frame arms 41 having hinge apertures 42, a generally planar mount surface 44 and a plurality of extensions 43, shown configured as tongues, adapted to engage portions of deflector 31. A hinge connection includes frame arms 41, pins 45 and cutting deck supports 46 (shown in FIG. 1). If the discharge chute assembly 30 contacts an obstruction during mowing operations, the hinge connection allows discharge chute assembly 30 to pivot about hinge axis PA allowing deflector 31 to avoid the obstruction. Once discharge chute assembly 30 has cleared the obstruction, the mass of extensions 43 facilitates a quick rotation of discharge chute assembly 30 back into its guarded position. Alternatively, when contacting other obstructions, resilient deflector 31 may deform to pass underneath the obstruction. In this case, deflector 31 returns to its original condition once cleared of the obstruction given the resilient properties of deflector 31.

The offset mass of extensions 43 (relative to the hinge axis) facilitates return of discharge chute assembly 30 to the guarded position without the requirement of an external spring bias. The offset mass of extensions 43 further facilitates a mower loading process wherein the discharge chute assembly 30, once lifted into an upright orientation, remains in the upright orientation without the requirement of an external spring, rope, wire, cord, etc., as the mower is moved or loaded onto a trailer.

In another embodiment of the invention, a biasing element, such as a torsion spring, may provide a force tending to bias the discharge chute assembly 30 into the guarded position as indicated in FIG. 1.

During assembly, extensions 43 of frame 40 are inserted into pockets 32 of deflector 31. Threaded fasteners are passed through apertures 47 in frame 40 and deflector 31 and secure mount surface 44 of frame 40 to mount surface 36 of deflector 31. Frame 40 is movably connected to mower deck 10 via pins 45 passing through hinge apertures 42 and deck supports 46.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A turf mower discharge chute assembly comprising:

a resilient deflector having a top wall and a cavity extending substantially parallel to said top wall, and having a mount surface angled away from said cavity, with a plurality of apertures extending through said mount surface, and a support frame secured at one end of said deflector, said frame aligning said deflector with a side discharge opening of a turf mower, said frame adapted to pivot said deflector about a pivot axis, and said frame defining at least one extension which is inserted into said cavity of said deflector, wherein said frame includes a mount surface adapted to engage said mount surface on said deflector, with said mount surfaces being secured together via a plurality of fasteners passing through the frame and the plurality of apertures of the deflector and being aligned generally perpendicular to said pivot axis, and with said frame defining a pair of frame arms extending in a direction generally opposite said at least one extension, with said pivot axis passing through said pair of frame arms.

2. The discharge chute assembly of claim 1 wherein said cavity is a closed cavity of said deflector.

3. The discharge chute assembly of claim 1 wherein said frame defines a portion of a hinge, said hinge permitting said chute assembly to pivot about the hinge axis.

4. The discharge chute assembly of claim 1 wherein the mount surfaces of the deflector and the support frame are positioned away from the pivot axis.

5. The discharge chute assembly of claim 1 wherein said deflector is substantially devoid of obstructions on an inner surface thereof.

6. The discharge chute assembly of claim 1 wherein said at least one extension is substantially flat.

7. The discharge chute assembly of claim 1 wherein said cavity is defined by a pair of generally parallel flat wall surfaces.

8. The discharge chute assembly of claim 7 wherein said cavity is generally parallel with a plane of rotation of a mower blade when said discharge chute assembly is in a guarded orientation.

9. A turf mower discharge chute assembly comprising:

a resilient deflector defining a top wall and a mount surface angled away from said top wall, and a support frame secured at one end of said deflector, said frame aligning said deflector with a side discharge opening of a turf mower, and said frame defining at least one extension which is retained within a closed pocket of said deflector, with said closed pocket being defined between said top wall and a bottom wall of said deflector, and with said at least one extension engaging interior surfaces of said pocket, and said frame including a mount surface positioned between said at least one extension and a pair of frame arms, with a pivot axis of the frame passing through the pair of frame arms and with the mount surfaces of the deflector and frame being positioned away from the pivot axis, and with a fastener passing through the mount surfaces of both the deflector and the support frame to secure the deflector to the support frame, and with said fastener being generally perpendicular to the pivot axis of the frame.

10. A discharge chute assembly for a turf mower comprising:

a resilient deflector having a top wall and a cavity and a mount surface angled away from said cavity, with a plurality of apertures extending through said mount surface; and a support frame having at a plurality of extensions and a mount surface angled away from said plurality of extensions and a pair of frame arms extending in a direction generally opposite said plurality of extensions and with a pivot axis passing through said pair of frame arms, said frame being pivotally connected to a mower deck about said pivot axis, wherein said plurality of extensions are received into said cavity of said deflector and a plurality of fasteners passing through the frame and the plurality of apertures of the deflector and being aligned generally perpendicular to said pivot axis.

11. The turf mower of claim 10 wherein said pocket is defined as a generally closed cavity within said deflector.

12. The turf mower of claim 10 wherein said pocket and said plurality of extensions are generally similarly shaped.

13. A discharge chute assembly for a turf mower comprising:

a resilient deflector; and a support frame having at least one extension, a mount surface having a plurality of apertures therethrough, and a pair of frame arms, said frame being pivotally connected to a mower deck carrying a rotating mower blade and having a side discharge opening through which said rotating mower blade transports grass clippings out of said mower deck, wherein said at least one extension is received into a portion of said deflector, and wherein said portion of said deflector includes a pocket, and with said at least one extension engaging interior surfaces of said pocket, and wherein a pivot axis extends through the pair of frame arms and a plurality of fasteners connecting the mount surface of the support frame to the deflector are generally perpendicular to the pivot axis.

\* \* \* \* \*